MATERIAL: G.P. POLYSTYRENE
RESIN TEMP.: 200°C
MOLD TEMP.: 35°C

FIG. 12

United States Patent Office 3,649,728
Patented Mar. 14, 1972

3,649,728
METHOD FOR MOLDING THERMOPLASTIC ARTICLES HAVING THROUGH-HOLES THEREIN
Norihisa Honsho, Neyagawa-shi, Satoshi Yasuda, Hirakata-shi, and Tamotsu Wakahata, Neyagawa-shi, Japan, assignors to Matsushita Electric Industrial Co., Ltd., Oaza Kadoma, Kadoma-shi, Osaka, Japan
Filed July 25, 1969, Ser. No. 844,935
Claims priority, application Japan, July 31, 1968, 43/54,757; Aug. 30, 1968, 43/62,469; Nov. 13, 1968, 43/84,107; June 17, 1969, 44/49,108
Int. Cl. B29c 11/00; B29f 1/14
U.S. Cl. 264—40
3 Claims

ABSTRACT OF THE DISCLOSURE

A method for producing a shaped article of thermoplastic material by molding said shaped article by injection molding and thereafter forming a hole or holes in said shaped article by punching, in which the punching is effected within the mold, immediately after the injection molding of the shaped article has been completed but before the shaped article is completely solidified, by a punching mechanism incorporated in the injection molding machine used, whereby formation of a weld-line in the shaped article is prevented and the production efficiency of the shaped article is promoted.

---

The present invention relates to a method for the formation of a hole of predetermined shape in a shaped article in the process of molding the shaped article in a metal mold or in a period from closure to opening of the metal mold, without removing the shaped article from the mold upon completion of molding, which are adapted for use mainly in the production of an article of thermoplastic material with a hole therein.

Figure 12:
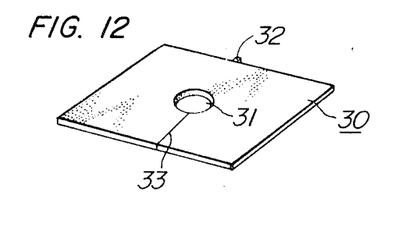
FIG. 12 is a perspective view of a shaped article produced by the conventional shaping apparatus and method.

In producing a perforated shaped article of thermoplastic material by injection molding, it has been customary to inject a molten thermoplastic material into a metal mold having a pin provided in the cavity thereof at a location corresponding to the hole in the shaped article to be produced. Such a method, therefore, has the drawback that a weld line 33, as shown in FIG. 12, is always formed in the shaped article 30, extending from the hole 31 in a direction opposite to the gate 32 with respect to said hole. Namely, the molten thermoplastic material poured into the mold cavity through the gate 32 is diverged into two streams by the hole-forming pin and merged together again on the opposite side of the gate 32 with respect to said pin, thus forming the weld line 33. The formation of such weld line 33 is most objectional because the appearance and accordingly the commercial value of the product shaped article are substantially impaired thereby, particularly when the shaped article is intended for use as an outer casing. Removal of the weld line has been carried out by buffing, which adds another procedure in the production operation with only a change in appearance but none in the strength of the article.

For producing a perforated shaped article free of weld lines, therefore, a method has been employed which comprises the steps of molding a shaped article with no hole therein and then forming a desired hole in said shaped article by means of drilling or hot-punching. However, this method necessarily involves a secondary processing for the formation of a hole, which lowers the production efficiency. In addition the formation of a hole by drilling is not feasible where the hole is not round but complicated in shape, whereas the formation of a hole by hot-punching frequently results in cracking of the shaped article or other defects, which makes the rejection percentage high and accordingly adds to the cost of the shaped article.

It is, therefore, an object of the present invention to eliminate the secondary processing hitherto required after removal of the shaped article from the metal mold, to promote the productivity of the shaped article and to produce a shaped article free of weld lines, by pouring a molten thermoplastic material into the mold and accomplishing the punching of the shaped article within the mold before the mold is opened, during the solidification time of said molten thermoplastic material.

Another object of the invention is to suitably relate the operation of the shaping mold with the operation of a punching die used, by means of an electric circuit and a hydraulic circuit which are effectuated upon detecting the operation of the shaping mold, whereby operating errors are eliminated and weld line-free, perforated, shaped articles of uniform quality can be obtained.

Still another object of the invention is to form a plurality of holes in the shaped article all at once during a period from the pouring of the thermoplastic material into the shaping mold to the opening of said mold by punching operation using a plurality of punches provided on a punching plate, and to remove the resultant cut pieces or slugs positively easily.

Still another object of the invention is to keep the punched surface of the shaped article neat and clean by effecting the punching immediately after pouring said molten thermoplastic material into said molding die and before the solidification of said thermoplastic material.

A further object of the present invention is to facilitate the removal of the shaped article from the shaping mold and to prevent deformation of the shaped article and/or the hole formed in said shaped article at the time of removal from the mold, by returning the punch to the original position upon completion of the punching operation, before the mold is opened.

An additional object of the present invention is to provide a practical apparatus for the production of a weld-line-free, perforated, shaped article by pouring a molten thermoplastic material into a shaping mold and punching the shaped article thus formed within said mold before said molten thermoplastic material is completely solidified.

These and other objects, features and advantages of the present invention will become apparent from the following detailed description when taken in conjunction with the accompanying drawings, in which.

Figure 1:
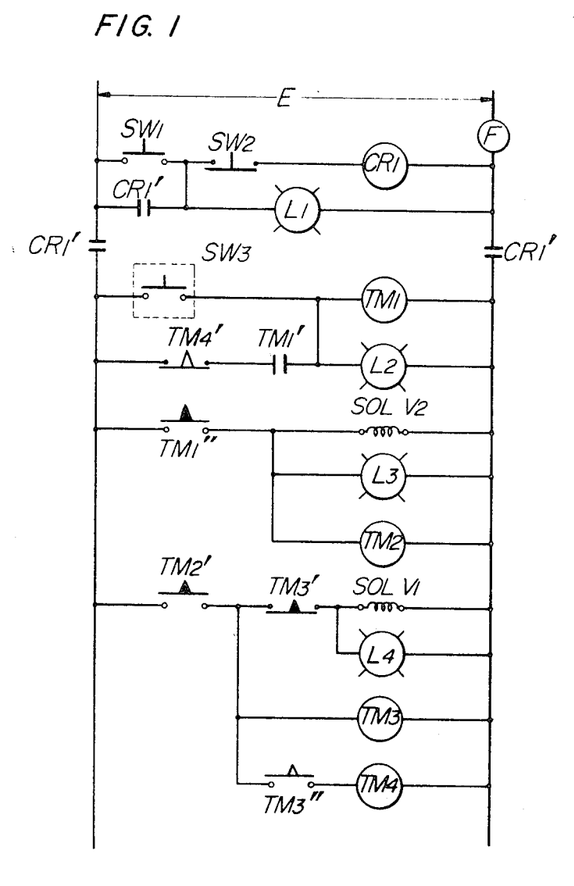
FIG. 1 is an electric circuit diagram of a shaping and punching apparatus according to the present invention.
Figure 2:
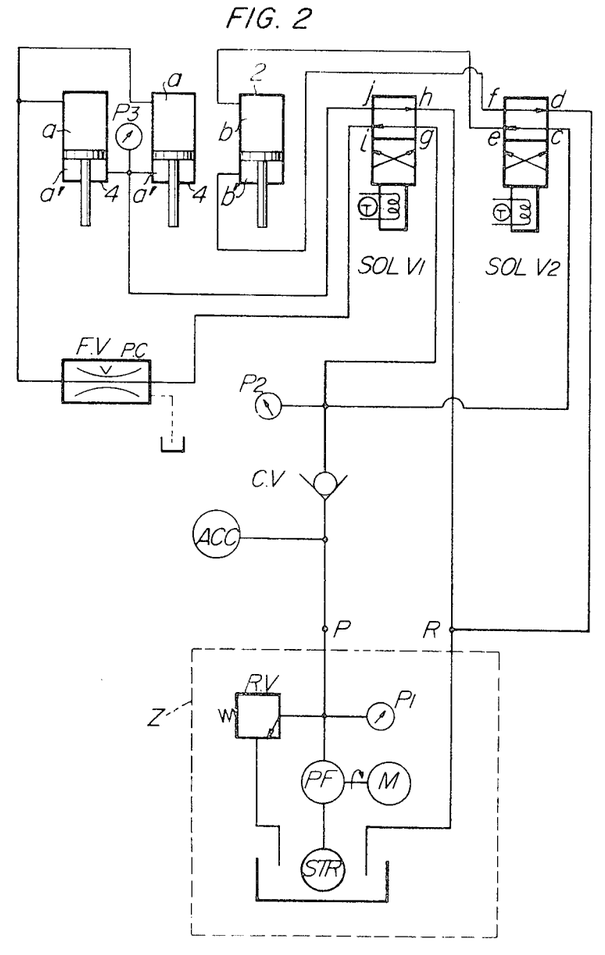
FIG. 2 is a hydraulic circuit diagram of the shaping and punching apparatus of FIG. 1.

Referring to the drawings and particularly to FIG. 1, there is shown an electric circuit which is actuated at the same time when the shaping mold of an associated injection molding machine has been closed, to control the operation of a hydraulic circuit, shown in FIG. 2, by which a punching mechanism is operated to effect punching of the shaped article molded in said mold.

As shown, the electric circuit comprises a 200 v. A.C. power source E, a main On-Off push-button switch SW1 and an emergency push-button switch SW2 which is operated in case of emergency. Upon operating the emergency switch SW2, a relay CR1 is actuated and the contact CR1' thereof is opened, whereby the operation of the entire apparatus is stopped and the apparatus restores its original inoperative position. A power source indicator lamp L1 is provided to indicate the main On-Off switch SW1 being closed. A starting switch SW3 is closed upon detecting the completion of closure of the mold of the injection molding machine (or the starting of injection of a thermoplastic material into the mold). Namely, when the starting switch SW3 is closed in response to a signal signifying the completion of closure of the mold of the injection molding machine (or the starting of injection), a punching mechanism incorporated in said injection molding machine is actuated. This starting switch SW3 is opened at the same time when the mold of the injection molding machine is opened. A time-limit relay TM1 is provided to control the elevation time of a slider shown in FIG. 3 and comprises an instantaneous contact TM1'. An indicator lamp L2 indicates the actuation of the time-limit relay TM1 where the starting switch SW3 has been closed. A delay contact TM1'' is closed a predetermined period after actuation of the time-limit relay TM1, whereupon a solenoid valve SOL V2, shown in FIG. 2, is energized to permit hydraulic fluid to flow into a chamber b' of a hydraulic cylinder 2 to elevate the slider 1. The energization of the solenoid valve SOL V2 is indicated by an indicator lamp L3. Another time-limit relay TM2 is provided to control the time of operation of a punch 3 shown in FIG. 3. This time-limit relay TM2 is actuated upon closure of the delay contact TM1''. Namely, the contact TM2' of the time-limit relay TM2 is closed upon passage of a predetermined time after closure of the delay contact TM1'', to energize a solenoid valve SOL V1, shown in FIG. 2, whereby fluid is introduced into chambers a' of respective hydraulic cylinders 4 to operate ram plates 5, 6 which carry punches 3 fixed thereto at one end. The operation of the punches 3 is vertified by an indicator lamp L4. Still another time-limit relay TM3 is provided for return movement of the punches 3. Namely, the contact TM3' of the time-limit relay TM3 is opened a predetermined period after closure of the aforesaid contact TM2', to return the solenoid valve SOL V1 to the original position and thus the punches 3 are returned to their original positions. When the contact TM3' is opened, the other contact TM3'' of the time-limit relay TM3 is closed at the same time to actuate a time-limit relay TM4 provided for causing a return movement of the slider 1 to the original position. A predetermined period after actuation of the time-limit relay TM4, the contact TM4' of said time-limit switch is opened, whereby all parts are returned to their original position.

Figure 3:
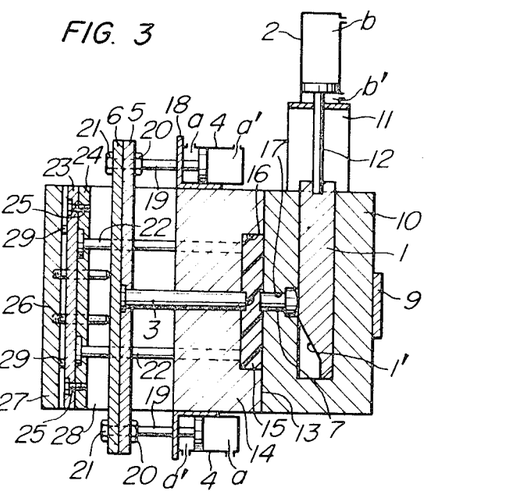
FIGS. 3 to 7 inclusive are respectively schematic views of the shaping and punching apparatus, illustrating the steps of the shaping operation.
Figure 4:
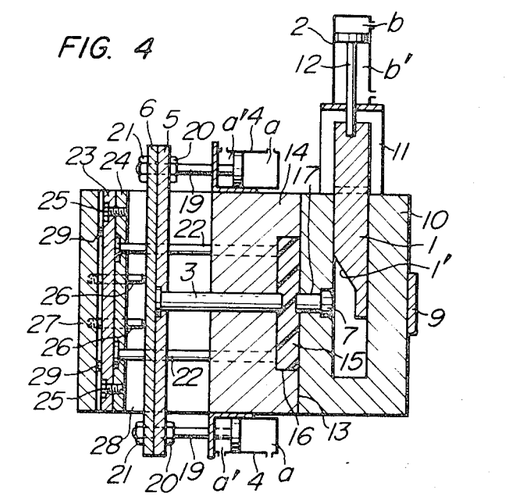

Now, one form of the hydraulic circuit used in the present invention will be described with reference to FIG. 2. The hydraulic circuit shown in FIG. 2 comprises a hydraulic pump unit Z of a known type which includes a strainer STR, a pump PF, a motor M, a relief valve R.V. and a hydraulic pressure gauge P1. Symbol P designates a discharge port and R a return port for fluid. The hydraulic circuit also comprises an accumulator ACC, a check valve C.V, a hydraulic pressure gauge P2 to measure the fluid pressure supplied through the check valve C.V, a flow control valve F.V, and the solenoid valves SOL V1 and SOL V2 mentioned previously. The hydraulic cylinders 4 and 2 are mounted on the molding die in a manner as shown in FIG. 3 for operating the ram plates 5, 6 and the slider 1 respectively.

Figure 7:
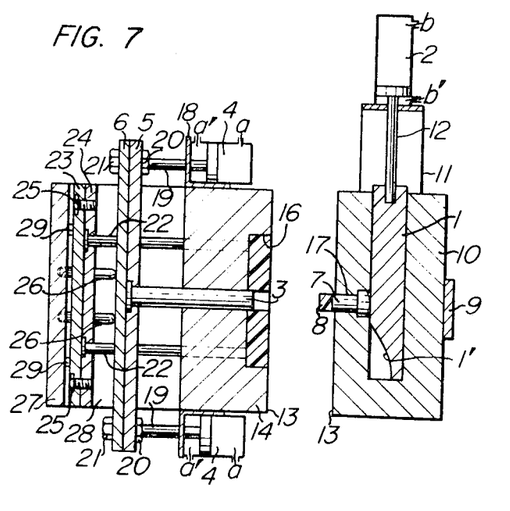
Figure 8:
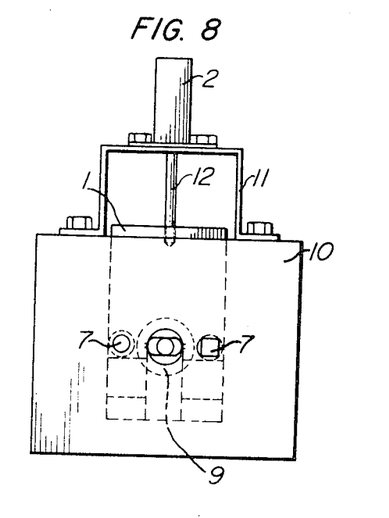
FIG. 8 is a side elevational view of the shaping and punching apparatus.

The hydraulic circuit having the construction as described above operates in the following manner: Namely, in a cycle of injection molding operation, when the time-limit relay TM1 is actuated and the delay contact TM1'' is closed with a certain time delay, the solenoid valve SOL V2 is energized permitting fluid to flow from a port c to a port f thereof to be introduced into the chamber b' of the hydraulic cylinder 2, so that the pressure is built up in said chamber b' causing the slider 1, shown in FIG. 3, to move upwardly. On the other hand, fluid supplied to the solenoid valve SOL V1 flows from a port g to a port i and then flows into the chambers a of the respective hydraulic cylinders 4 through the flow control valve F.V. In this case, however, the hydraulic cylinders 4 are not actuated. Then, the contact TM2' of the time-limit relay TM2 is closed and thereby the solenoid valve SOL V1 is energized, the fluid flows from the port g to a port j and is introduced into chambers a' of the respective hydraulic cylinders 4. The hydraulic cylinders 4 are actuated and operate the ram plates 5, 6, so that the punches 3 fixed to said ram plates 5, 6 punch the shaped article molded in the shaping mold. In this case, the ram plates 5 and 6 are operated in parallel to each other by the function of the flow control valve F.V. Upon lapse of a predetermined time, the time-limit relay TM3 is actuated to energize the solenoid valve SOL V1, whereupon the fluid flows from a port g to the port i and is introduced into the chambers a of the respective hydraulic cylinders 4, so that the ram plates 5, 6 and the punches 3 carried thereby are returned to the original positions. A predetermined time thereafter, the time-limit relay TM4 is actuated to energize the solenoid valve SOL V2, whereupon the fluid flows from the port c to a port e to be led into the chamber b of the hydraulic cylinder 2. Therefore, the slider 1 is returned to its original position and the ejector punches 7 are returned to their original position by being pushed by the said slider 1, as shown in FIG. 7. In this case, slugs 8 cut out of the shaped article by punching are forced out of the parting faces of the mold by the ejector punches 7 and drop down.

Next, details of the metal mold will be explained with reference to FIGS. 3 to 8. The metal mold comprises a locating ring 9, a fixed mold member 10 with the slider 1 vertically slidably mounted therein, a bracket 11 for mounting the hydraulic cylinder 2 thereon, said hydraulic cylinder having a piston therein whose piston rod 12 is secured to the top end of the slider 1, and a movable cavity mold member 14 cooperating with said fixed mold member 10 in mating engagement therewith at the parting faces 13 thereof. The movable cavity mold member 14 has a cavity 16 therein, in which is injected a thermoplastic resin material, when the parting surfaces 13 of the respective mold members are in mating engagement with each other, to mold a shaped article 15. Upon completion of the molding, the movable cavity mold member 14 is retracted with its parting surface 13 parting from the opposite parting surface 13 of the fixed mold member to provide for removal of the shaped article 15 from the cavity 16. In injecting the resin material into the cavity 16, the ejector punches 7, slidably received in respective bores 17 formed in the fixed mold member 10, are supported at their rear ends by the slider 1, so that said ejector punches 7 will not be retracted from the parting surface 13 of said fixed mold member 10 under the pressure of the resin material. The punches 3 slidably extending through the movable cavity mold member 14 in opposed relation to the respective ejector punch receiving bores 17, are fixed to the ram plates 5, 6. The ram plates 5, 6 are connected with the piston rods 19, 19 of pistons, mounted in the respective hydraulic cylinders 4, 4, by means of nuts 20, 21, which piston rods extend through a bracket 18 through which said hydraulic cylinders 4, 4 are mounted on the upper and lower sides of the cavity mold member 14 respectively. Ejector pins 22 having one ends thereof fixed by ejector plates 23, 24, slidably extend through the ram plates 5, 6 and the movable cavity mold member 14, with the other ends reaching the bottom face of the cavity 16 formed in said cavity mold member, and serve to eject the shaped article 15 from the cavity after the mold has been opened. The ejector plates 23, 24 are tightened together by bolts 25. Pins 26 are provided to support the ram plates 5, 6 in injecting the resin material into the cavity 16, so that the punches 3 and accordingly the ram plates 5, 6 will not be moved backward under the pressure of the resin material being poured. These pins 26 have one ends fixed to a mounting plate 27 on the movable side and the other ends thereof extending through the ejector plates 23, 24 to provide for sliding movement of said ejector plates therearound. The mounting plate 27 and the movable cavity mold member 14 are held in a predetermined spaced relation to each other by a spacer blocks 28 interposed therebetween. Reference numeral 29 designates stopper pins to limit the backward movement of the ejector plates 23, 24.

Figure 5:
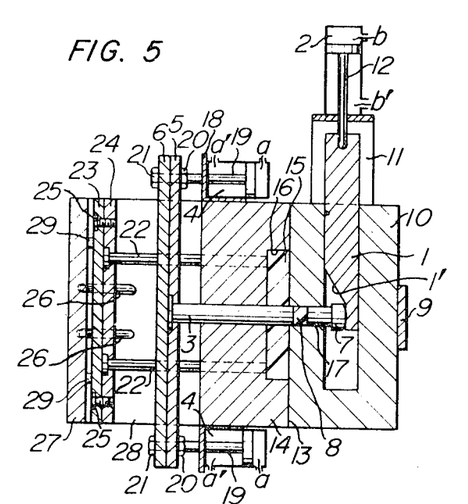
Figure 6:
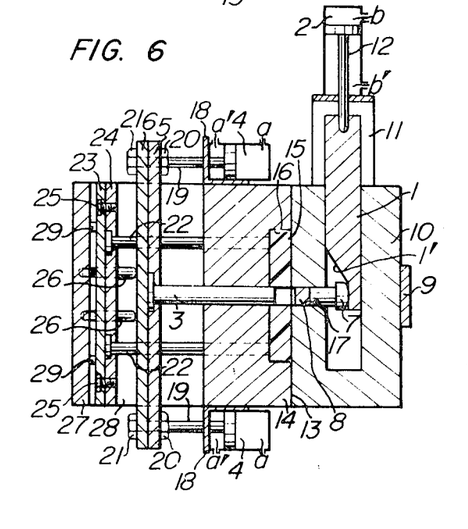

Now, the shaping operation of the injection molding machine constructed as described above will be described with reference to FIGS. 3 to 7 and FIG. 9 hereunder: First of all, the injection molding machine is set in the position shown in FIG. 3 and a molten material is injected into the cavity 16. At the same time, the time-limit relay TM1 is actuated but the delay conact TM1″ thereof is closed a predetermined time after actuation of said relay or upon completion of the resin injecting operation. The closure of the delay contact TM1″ results in energization of the solenoid valve SOL V2, so that fluid is introduced into the chamber b′ of the hydraulic cylinder 2 and the slider 1 is moved upward, through the piston rod 12, to a position shown in FIG. 4. Then, the time-limit relay TM2 is actuated to energize the solenoid valve SOL V1 and the pressure fluid is introduced into the chambers a′ of the respective hydraulic cylinders 4, causing the piston rods 12 to move to the right. Accordingly, the ram plates 5, 6 and the punches 3, carried thereby, are moved to the right to punch the resin material in the cavity 16 which has not been completely hardened. In this case, the slugs 8 forced out of the molds are pinched between the punches 3 and the corresponding ejector punches 7 as shown in FIG. 5. Here, it should be noted that the faster the punching operation of the punches 3 is, the more beautifully the punched surface of the molds will be finished. The molds thus punched is cooled in the state shown in FIG. 5. The time-limit relay TM3 is so set that the punches 3 will be returned to their original positions a little while before completion of the cooling. Therefore, the punches 3 are completely returned to their original positions as shown in FIG. 6, before the mold is opened. In this case, the timing of the return movement of the punches 3 is important because, if the punches 3 are returned to their original positions too early, the dimensional accuracy of the punched holes cannot be secured due to shrinkage of the resin caused by cooling.

Then, the movable cavity mold member 14 is moved to the left to open the mold and at the same time the ejector plates 23, 24 and the ejector pins 22 carried thereby are moved to the right, whereby the shaped article 15 in the cavity 16 of the movable cavity mold member is ejected therefrom and drops from the parting surface 13 of said cavity mold member. In this case, the punches 3 are already restored, so that the operation of ejecting the shaped article 15 from the mold cavity 16 by the ejector pins 22 can easily be attained and further there is no possibility of the shaped article being curved or the punched holes being deformed or damaged, and even when the shaped article is molded of G.P. polystyrene resin and vulnerable to breakage, the shaped article will not be broken.

The time-limit relay TM4 is so set that the slider 1 will be returned to its original position before the opening of the mold is completed. Therefore, pressure fluid is supplied into the chamber b of the hydraulic cylinder 2 under the action of the time-limit relay TM4 and the slider 1 is lowered to the original position before completion of opening of the mold. By the downward movement of the slider 1, the ejector punches 7 are pushed at their rear ends by a curved surface 1′ of the slider 1 and slide in the respective bores 17, with their forward ends projecting forward to the parting surface 13 of the fixed mold member 10, whereby the slug 8 resulting from punching are ejected from the respective bores 17. This state is shown in FIG. 7. The slugs thus ejected from the bores 17 drop down through the space between the parting surfaces 13, 13 of both mold members under gravity. If the cut pieces 8 do not drop gravitationally, compressed air or other means may be used. By the steps described above, one cycle of the perforated shaped article molding operation has been accomplished, so that the mold is closed again for the next cycle of operation.

Figure 9:
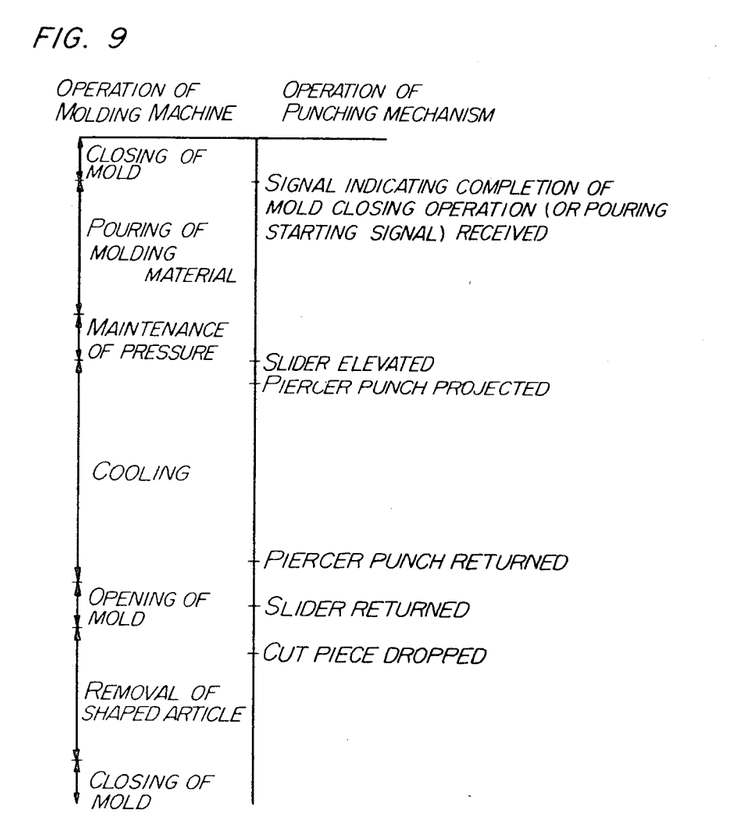
FIG. 9 is a diagram showing the timed relationship between the molding operation and the punching operation.
Figure 10A:
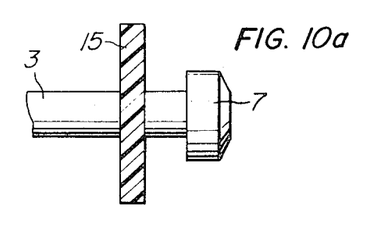
FIG. 10 is a set of views showing the relative positions of a punch and an ejector punch.
Figure 10B:
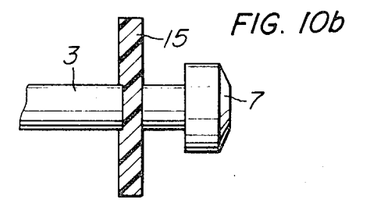
Figure 10C:
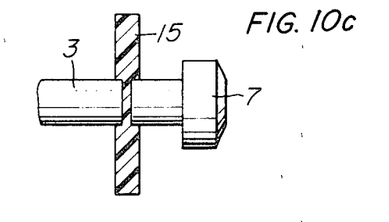
Figure 10D:
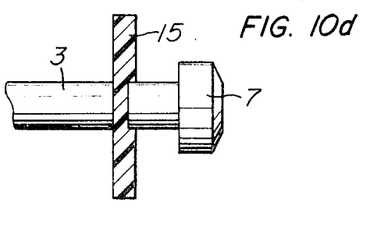
Figure 11:
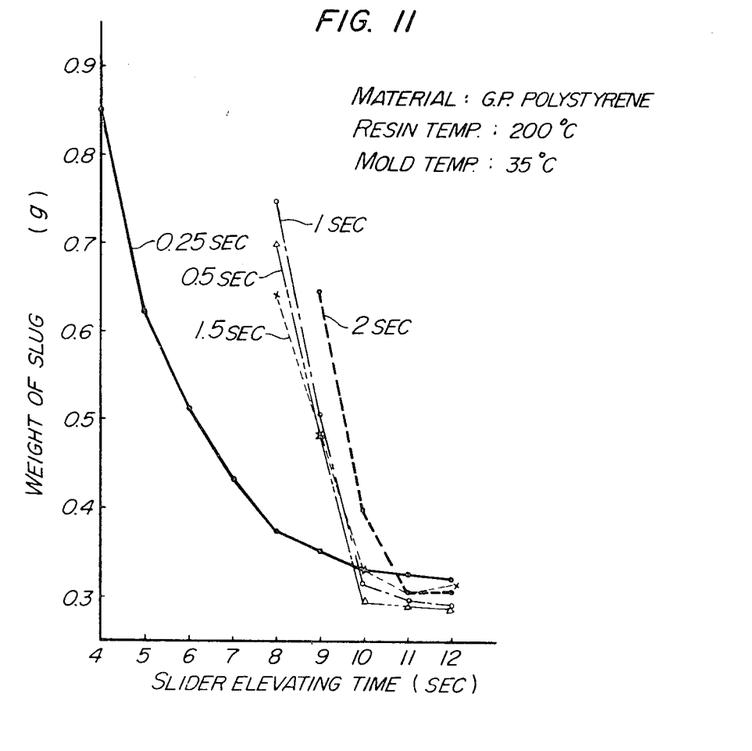
FIG. 11 is a diagram graphically showing the relationship between the elevating time of a slider and the projecting time of the punch, in terms of change in weight of a slug.

Next, the timing of operations of the respective elements relative to each other will be explained in detail with reference to FIG. 9. The time when the slider 1 is caused to move upwardly is preferably selected within a period from the time when the injection of resin material has been completed to the time when about ⅘ of the cooling time of the molten resin has lapsed. Because if the slider 1 is lifted too early, a sink mark will be formed on the peripheral surface of the punched hole, whereas if the slider is lifted too late, whitening or crack will result. In general, the most suitable time of lifting the slider 1 is about 3 to 30 seconds after pouring of the molten resin was commenced, though variable depending upon the size of the shaped article. As regards the time of projection of the punches 3, the present inventors conducted an experiment with a view to determine the workable range of the shaped article, in which the punches were projected 0.25 second, 0.50 second, 1.00 second, 1.50 seconds and 2.00 seconds after the upward movement of the slider 1 had been started respectively and the weight of the slugs of resin material was measured in each case, the result of which is shown in FIG. 11. When the punches were operated 0.50 to 2.00 seconds after starting of upward movement of the slider, holes could not be punched in the shaped article unless said slider was lifted over a period of 8 seconds or longer. Further, for the same period of lifting of the slider, the weight of the slugs, resulting from punching, was smallest and the most beautiful punched surface was obtained when the time interval between the time of projection of the punches and the time of lifting the slider was 0.25 second. Smaller weight of the slug means less sink mark formed around the periphery of the punched hole, since the amount of the resin material injected is fixed. In view of the foregoing, the time interval from the time lifting the slider to the time of projecting the punch is preferably within 0.5 second. Obviously, however, the time interval specified above is variable somewhat depending upon the size and shape of the shaped article. A suitable time of retracting the punch is within a period from about 20 seconds before the starting of opening of the mold to the time of opening the mold. Further, a suitable time of returning the slider to the original position is within a period from the time when opening of the mold is commenced to the time when closing of the mold is commenced.

Now, the relative position of the punch 3 and the ejector punch 7 will be explained with reference to FIGS. 10a to 10d. In these figures there are shown four different relative positions of the punch 3 and the ejector punch 7. It is important that the confronting end faces of the punch 3 and the ejector punch 7 are both located in the same plane as or inwardly of the opposed inner surface of the mold cavity 16, because if either or both of the confronting end faces of said punch and said ejector punch is or are located in a retracted position or positions relative to the associated inner surface or surfaces of the mold cavity 16, a sink mark will result in the shaped article.

It is to be noted that while in the embodiment described and illustrated herein the punches are provided through the movable cavity mold member and the ejector punches through the fixed mold member, it will be apparent that the punches may be provided through the fixed mold and the ejector punches through the movable cavity mold member. It is also to be noted that the hydraulic cylinders may be replaced by air cylinders. It will also be obvious that the number of the punches may be one or more and the cross-sectional shape of the punch is not restricted only to a simple circular shape but may be a polygonal shape, elongate shape or slit-like shape.

According to the present invention, the following advantages can be achieved: Namely, (1) In the method of this invention, a molten thermoplastic resin material is poured into a molding die and thereafter the resultant shaped article is punched before the mold is opened. Therefore, it is not necessary to provide a pin in the mold cavity at a location corresponding to the location of a hole to be formed in the shaped article, as has been practiced heretofore, and hence no weld line is formed in the shaped article. Furthermore, since the punching operation is effected in the process of cooling of the shaped article within the mold, the hardening period of the shaped article can effectively be used and, therefore, the operational efficiency of the production of a perforated shaped article can be markedly enhanced. Furthermore, according to the method of this invention no secondary processing is required for punching and other purposes and a crack-free beautiful punched surface can be obtained.

(2) According to the invention, the punching mechanism is incorporated in the shaping mold and is operated automatically, before the shaping mold is opened for the removal of a shaped article molded therein, by a hydraulic circuit under control of an electric circuit which is actuated in response to a signal representing the position of said shaping mold. Therefore, a weld-lineless, perforated shaped article can be obtained completely automatically. In addition, since the punching operation is effected at a fixed time for all shaped articles to be produced, shaped articles of uniform quality can be obtained in an efficient manner, with no erroneous operation.

(3) The apparatus according to the present invention comprises a metallic shaping mold in which a shaped article is to be molded of a resin material by injection molding, a punch or punches for punching the shaped article before said shaped article is removed from the shaping mold, an ejector punch or punches disposed in opposed relation to said punch or punches respectively, a slider which supports the rear end or ends of said ejector punch or punches when the molten resin material is poured into the shaping mold but releases the same from engagement therewith at the time of punching and urges the ejector punch or punches towards the parting surface of said mold when said mold is opened, ram plates for carrying the punch or punches fixed thereto and cylinders for operating said ram plates and said slider. Therefore, it is possible to produce a weld-lineless perforated shaped article highly efficiently, to form a plurality of holes in the shaped article all at once simply by increasing the number of the punches carried by the ram plates and to change the shape of the holes simply by using punches of different configurations. Furthermore, the slugs resulting from punching can be readily removed from the mold by the ejector punches which are projected towards the parting surface of the mold by the action of the slider.

(4) According to the present invention, the slider supporting the rear end of the ejector punch is disengaged therefrom and immediately thereafter the shaped article is punched by the punch at a high speed, after the shaped article-forming resin material has lost it fluidity but before the same is completely solidified. Therefore, a weld-lineless perforated shaped article can be obtained which has a beautiful punched surface free of crack and sink mark.

(5) Still according to the present invention, upon completion of th punching operation, the punch is returned to the original position before the mold is opened and the punched shaped article is removed from the mold cavity by the ejector pins when said mold is opened. Namely, the punch is already disengaged from the punched shaped article when the shaped article is removed from the mold by the ejector pins. Therefore, the operation of removing the shaped article by the ejector pins will not be interfered by the punch even when the shaped article is not moved by said ejector pins in parallel to the side faces of the mold cavity and hence the shaped article can be removed easily without being bent or having the punched surface damaged or having the punched hole being deformed. This is particularly advantageous when the shaped article is molded of a material vulnerable to damage.

(6) According to another aspect of the present invention an apparatus for shaping a thermoplastic article comprises a pair of shaping mold members defining a molding cavity in the parting surfaces thereof for pouring a molten thermoplastic resin therein, a punch extending through one of said mold members for punching a shaped article molded in said cavity, a hydraulic cylinder for operating said punch through a ram plate, ejector pins moved into said cavity for rejecting the shaped article and retracted therefrom in pouring the molten thermoplastic material, a bore drilled through another one of said mold members in opposed relation to said punch, an ejector punch slidably received in said bore, a slider having a curved surface to support the rear end of said ejector punch and slidably mounted in said another mold member, a hydraulic cylinder for operating said slider, a time-limit relay for actuating said second hydraulic cylinder to shift said slider and disengage the same from the rear end of said ejector punch when the molten thermoplastic material in said cavity has been semi-hardened, another time-limit switch for actuating said first hydraulic cylinder to effect a punching operation of said punch immediately after said slider has been disengaged from the rear end of said ejector punch, still another time-limit relay for actuating said first hydraulic cylinder to return said punch to its original position before said pair of mold members are opened and still another time-limit relay for actuating said second hydraulic cylinder to operate said slider so as to move said ejector punch forward by the curved surface of said slider in a period from the time when the mold members are started to be opened to the time when said mold members are closed. In the apparatus described above, the two hydraulic cylinders are operated in suitably timed relation by the four time-limit relays to operate the respective operating parts associated therewith, so that the punching of the shaped article can be effected smoothly easily and a crack-free, beautiful punched surface can be obtained. It is also possible to prevent formation of a sink mark and to remove the shaped article from the mold by the ejector pins easily, without causing a damage to the shaped article because the punch is retracted to its original position before the molds are opened. Further, the slug resulting from punching can be readily ejected from the mold by the ejector punch incident to opening of the mold. Still further, the punching operation and the slug removing operation can be accomplished during the process of opening of the mold respectively, it is not necessary to provide a time specifically for such operations and hence the shaping and punching and operations can be carried out highly efficiently, without necessitating a secondary processing after removal of the shaped article from the mold.

What is claimed is:

1. A method for producing a shaped article having at least one through-hole from thermoplastic material using a mold provided with at least one punch slidably mounted in one element of said mold and an ejector slidably mounted in a second element of said mold in opposing relation to said punch with a cavity in said mold therebetween comprising the steps of closing said mold elements to form said cavity therein, initially holding said punch and ejector at respective positions where the forward ends thereof are flush with or slightly protruded beyond the wall surface defining said cavity, injecting a molten thermoplastic material into said cavity, cooling said material in said mold cavity, plunging said punch into said cavity before said material is completely cooled and solidified, thereby forcing a slug of said material corresponding to said through-hole out of said cavity by said punch, said ejector being caused to move backward in said second element such that said slug of material is received within said element beyond said wall surface, returning said punch to its initial position before said mold is opened, opening said mold, removing the shaped article having at least one through-hole from said mold, and returning said ejector to its initial position after said mold is opened to eject said slug from said mold.

2. A method for producing a shaped article according to claim 1, characterized in that said punch and ejector are operated through a hydraulic system which is adapted to be electrically actuated in response to a signal representing the completion of the closing operation of said mold or the start of the injecting operation.

3. A method for producing a shaped article according to claim 2, characterized in that the removal of said article from said mold is attained by ejector pins.

References Cited
UNITED STATES PATENTS

| | | | |
|---|---|---|---|
| 2,921,343 | 1/1960 | Mumford | 264—156 |
| 3,440,909 | 4/1969 | Schmid et al. | 83—123 X |

ROBERT F. WHITE, Primary Examiner

J. H. SILBAUGH, Assistant Examiner

U.S. Cl. X.R.

18—30 Y, 42 D; 264—156, 163, 334